March 19, 1929. A. O. HURXTHAL 1,706,232
BALL BEARING HOUSING
Filed May 13, 1927
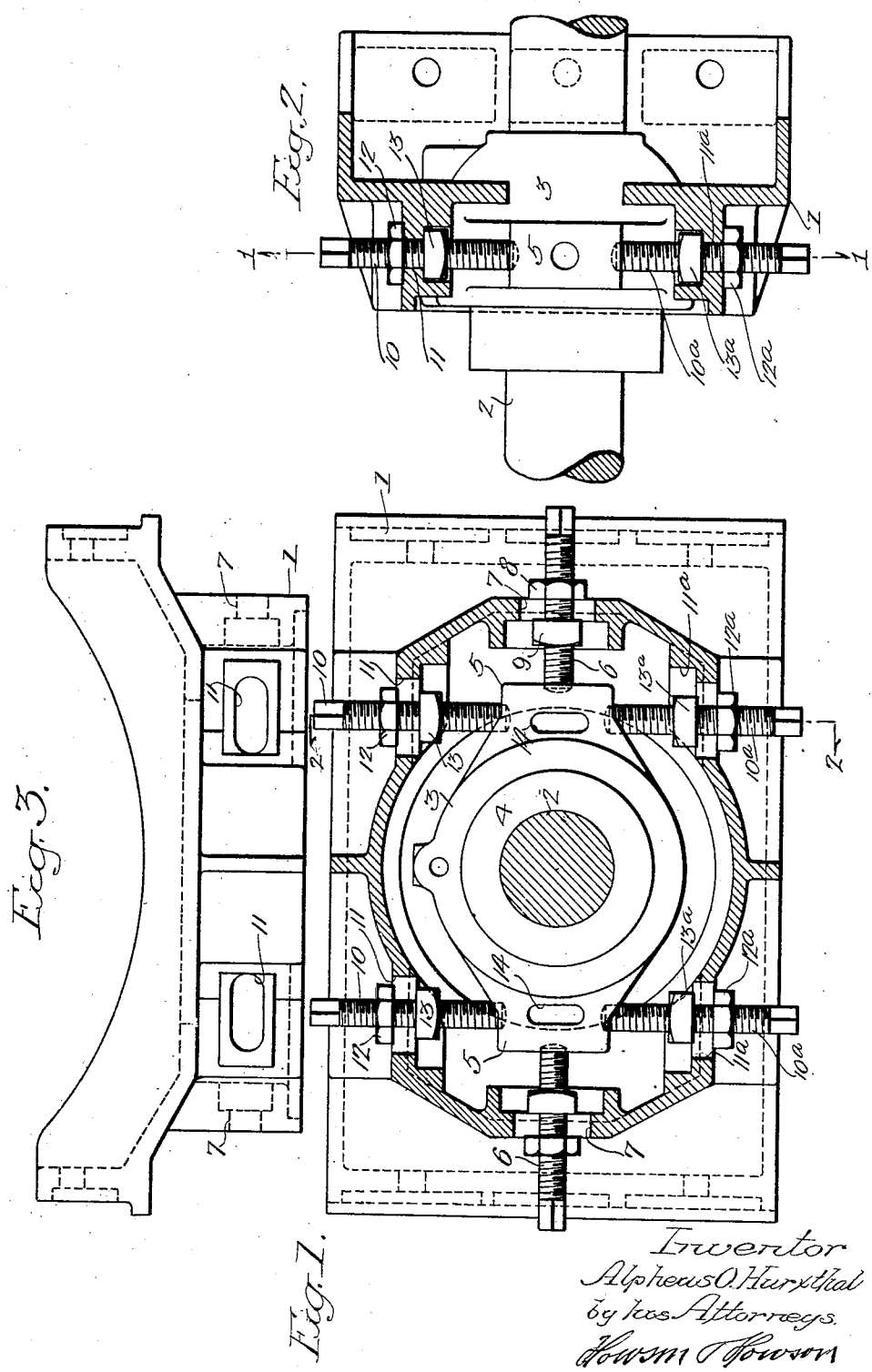

Patented Mar. 19, 1929.

1,706,232

UNITED STATES PATENT OFFICE.

ALPHEUS O. HURXTHAL, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA.

BALL-BEARING HOUSING.

Application filed May 13, 1927. Serial No. 191,111.

The object of my invention is to provide a housing for a ball-bearing which can be adjusted vertically or laterally without cramping or binding the working parts of the ball-bearing. The binding of the parts in many instances ruin the ball-bearing.

In the accompanying drawing:

Fig. 1 is a sectional view on the line 1—1, Fig. 2, showing the ball-bearing housing in elevation;

Fig. 2 is a sectional view on the line 2—2, Fig. 1, also showing the housing in elevation; and Fig. 3 is a plan view.

The frame 1, in the present instance, is shaped to fit the structural supports of a drying machine, and the shaft 2 is a fan shaft extending into the drier and provided with a fan at its inner end and a driving pulley at its outer end, but it will be understood that the frame can be of any shape, depending upon the machine or apparatus to which it is attached.

The housing 3 for the ball-bearing 4 is shaped, in the present instance, as shown in Figs. 1 and 2, and has laterally extending lugs 5—5 shaped to receive the ends of the adjusting screws.

The two screws 6—6 are arranged horizontally and bear upon the ends of the lugs, and by adjusting the screws 6—6, the housing can be moved laterally.

The screws 6—6 extend through vertical slots 7—7 in the frame 1, and on the screws at each side of the slotted portion of the frame are nuts 8 and 9, for locking the screws in the position in which they are adjusted. The slots 7 allow the housing to be adjusted vertically by other screws.

In order to adjust the housing vertically, four screws 10—10ª are provided. The screws 10 bear upon the upper surface of the lugs 5—5, and extend through slots 11 in the frame 1. On each screw are nuts 12 and 13 which clamp the screws firmly to the frame after adjustment.

The screws 10ª extend through slots 11ª in the frame and bear upon the underside of each of the lugs 5. On the screws 10ª are nuts 12ª and 13ª which confine the screws to the frame after adjustment.

By the above-described construction, the ball-bearing housing can be shifted as described to bring the shaft in proper alignment with the rest of the equipment.

The lugs 5 are made substantial so that any pressure exerted upon the lugs will not disturb the body of the housing and the ball-bearing.

In some instances, the lugs 5 may be slotted, as at 14, in alignment with the side bearing screws 6—6, so that when excessive pressure is applied by turning said screws, the cast metal between the slot and the end of the screw would give and thereby prevent possible distortion of the housing and bearing.

When it is wished to adjust the housing laterally, the screws 10—10ª are released from the frame by turning the nuts. Then the screws 6—6 can be turned to shift the housing to the position desired, and after adjustment the several nuts can be tightened.

If the housing is to be adjusted vertically, then the nuts on the screws 6—6 are backed-off and the screws 10—10ª turned. When the housing has been moved to the position desired, then the nuts are tightened.

I claim:

1. The combination of a frame; a housing mounted in the frame; laterally extending lugs on the housing; adjusting screws bearing against the end of each lug; vertically adjustable screws bearing upon the upper and lower sides of the lugs, the frame being slotted for the passage of the several screws and nuts on each; and screws on each side of the slotted portions of the frame for holding the screws after adjustment.

2. The combination of a frame; a housing located in the frame, said housing having a lug at each side; means for vertically adjusting the housing; and adjusting screws bearing against the ends of the lugs, said lugs being slotted in line with the screws to allow the metal between the slots and the ends of the screws to give under excessive pressure.

ALPHEUS O. HURXTHAL.